United States Patent
Hans et al.

(10) Patent No.: US 10,440,601 B2
(45) Date of Patent: Oct. 8, 2019

(54) CONTROLLING UPLINK TRAFFIC RECEIVED BY MULTIPLE BASE STATIONS

(71) Applicant: IPCom GmbH & Co. KG, Pullach (DE)

(72) Inventors: Martin Hans, Bad Salzdetfurth (DE); Maik Bienas, Schoeppenstedt (DE); Andreas Schmidt, Braunschweig (DE); Achim Luft, Braunschweig (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 15/774,123

(22) PCT Filed: Nov. 24, 2016

(86) PCT No.: PCT/EP2016/078701
§ 371 (c)(1),
(2) Date: May 7, 2018

(87) PCT Pub. No.: WO2017/089473
PCT Pub. Date: Jun. 1, 2017

(65) Prior Publication Data
US 2018/0324622 A1 Nov. 8, 2018

(30) Foreign Application Priority Data

Nov. 24, 2015 (EP) .................................. 15195991

(51) Int. Cl.
*H04L 12/26* (2006.01)
*H04W 24/10* (2009.01)
(Continued)

(52) U.S. Cl.
CPC .......... *H04W 24/10* (2013.01); *H04W 24/02* (2013.01); *H04W 72/0413* (2013.01); *H04W 72/085* (2013.01)

(58) Field of Classification Search
CPC . H04W 24/02; H04W 24/10; H04W 72/0413; H04W 72/085
See application file for complete search history.

(56) References Cited

U.S. PATENT DOCUMENTS

| | | | |
|---|---|---|---|
| 2002/0068534 A1* | 6/2002 | Ue | H04L 1/0002 455/92 |
| 2002/0118665 A1 | 8/2002 | Cleveland et al. | |

(Continued)

OTHER PUBLICATIONS

International Search Report and Written Opinion for International Application No. PCT/EP2016/078701, dated Feb. 20, 2017.

*Primary Examiner* — Minh Trang T Nguyen
(74) *Attorney, Agent, or Firm* — Marshall, Gerstein & Borun LLP

(57) ABSTRACT

The invention provides a method of controlling a mobile communication network, the method comprising, an uplink controlling entity, in response to reception quality measurement reports sent by a plurality of reception points within the mobile communication network following a transmission of data by a user equipment device, the reception quality measurement reports being responsive to the reception of the transmission, configuring the reception points within the mobile communication network such that each of the multiple reception points is configured to exhibit a participation behavior with respect to at least one of subsequent measurement reporting and payload reporting with regard to transmissions from the user equipment device, the participation behavior being dependent on the reception quality measurement report.

18 Claims, 3 Drawing Sheets

(51) Int. Cl.
*H04W 24/02* (2009.01)
*H04W 72/04* (2009.01)
*H04W 72/08* (2009.01)

(56) References Cited

U.S. PATENT DOCUMENTS

| | | | |
|---|---|---|---|
| 2009/0143074 A1* | 6/2009 | Pelletier | H04W 72/1284 455/452.2 |
| 2014/0133415 A1 | 5/2014 | Damnjanovic et al. | |
| 2014/0204871 A1 | 7/2014 | Ode | |
| 2014/0349659 A1* | 11/2014 | Ishii | H04W 76/10 455/444 |
| 2015/0049649 A1 | 2/2015 | Zhu et al. | |

\* cited by examiner

CONTROLLING UPLINK TRAFFIC RECEIVED BY MULTIPLE BASE STATIONS

CROSS-REFERENCE TO RELATED APPLICATIONS

This is the United States national phase of International Patent Application No. PCT/EP2016/078701, filed Nov. 24, 2016, which claims the priority benefit of European Application No. 15195991.3 filed on Nov. 24, 2015. The entire contents of each of the foregoing are incorporated herein by reference.

FIELD OF THE DISCLOSURE

The present invention relates to the control of transmission and reception points in a mobile communication network.

BACKGROUND

Different names are used for base stations in mobile communication networks operating according to different standards, for example Node B in UMTS, evolved NodeB (eNB) in LTE, Access Point (AP) in WiFi. Also, different names are used in case the base stations have a different set of functionalities compared to normal base stations, e.g. "remote radio heads", "repeater", "home (e)NB" or "small cells". In context of the present invention these different types of base stations are referred to generally as "transmission points" when the downlink (tower to handset) is concerned and "reception points" when the uplink (handset to tower) is concerned, respectively.

These transmission points may be arranged to build a single frequency network (SFN) and therefore appear as one single cell to the mobile devices. In addition, transmission points can be added to and removed from a set of transmission points that are currently transmitting data to a specific mobile device (user equipment, UE) according to UE's movement to cover the area where the UE is expected to move next, i.e. with regard to transmission to a specific UE some transmission points are switched on and some are switched off according to UE's movement. If there is no need for a transmission point to transmit to any UE it may also be totally switched off (powered down, standby).

In the context of this invention the term SFN may be understood as a set of synchronously operating transmission/reception points that typically cover an area of larger extension, but also as a sub set of transmission/reception points from this larger set (so-called SFN Clusters).

The current invention may be especially useful in a network of transmission and reception points in which transmission points are setup to build an SFN. However, the invention is beneficial also in networks where transmission points generally transmit in an unsynchronized manor or appear as individual cells to a mobile device.

The current invention concerns network node interactions to efficiently collect uplink (UL) traffic in the network from multiple reception points and dynamically controlling reception points to participate in UE-specific UL routing.

In known mobile networks, techniques have been deployed that use multiple transmission and/or reception points in the network to increase efficiency or data rate of a UE's communication link.

In UMTS (3G, CDMA based), a soft handover (SHO) specified, where a single UE maintains several links to different base stations and transmits data individually to these in the UL. The links are explicitly established by the network, the UE encodes data individually for every link and all participating base stations forward received data to the radio network controller for combination of the data to a single UL data stream.

In LTE there is a concept of dual connectivity that allows a single UE to deliver data to (and receive data from) multiple base stations simultaneously. The UE uses distinct radio resources configured for each of the cells to transmit different data to the base stations. Every involved base station forwards received data further to the network and no dynamic selection of forwarding function from a group of receiving base stations is known.

Other concepts in LTE are carrier aggregation and coordinated multipoint (CoMP) in which a single UE transmits data in parallel on different carriers (i.e. different frequencies) or to different cells, but in both cases the reception points are co-located (in the same eNodeB) so that any kind of backhaul coordination is obsolete.

US 2013/0089034 A1 describes a method and base station to select one out of a plurality of base stations to serve a UE in UL. A single base station already serving the UE in DL controls the method, which involves by the UE sending reference signals in UL to multiple base stations. The base stations receive and decrypt (decode) the signals and send the received signal strength to the controlling base station for selection of the one base station to serve the UE in UL. The selection is fixed; the selected base station serves the UE.

The application does not describe a dynamic (repeated) selection of the currently best base station as well as the selection of multiple base stations to serve a UE. Also, the selected base station will be solely responsible for UL data forwarding and thus there is no mentioning of different involvements the base station can have with respect to the UL transmission.

WO 2012/095759 describes a method, a serving base station and a cooperating base station for combining UL data traffic received by the cooperating base station and by the serving base station taking into account decoding soft output values and certainty values. The cooperating base station sends received UL data as soft output and certainty values to the serving base station, which combines the UL data with corresponding values it received itself.

The application does not describe dynamic configuration techniques. The combination of data from different base stations is described. The principle is similarly used already in UMTS for soft handover.

US 2006/0286996 proposes a method for selecting a base station serving a UE for the UL from a candidate set of base stations. The selection is done by the UE based on UL reception in the base station, which UL reception may be estimated by the UE from power control commands received from the base station, HARQ feedback received from the base station or transmit power in the DL. The UE sends signals on dedicated control channels (one for each candidate base station) or the UE multiplexes dedicated signals onto one common control channel. In any case, base station specific signals are sent and the UE is configured to explicitly address the base stations.

The application does not describe multiple base stations receiving and measuring the same (not base station specific) signals and providing their measurement to a central unit in the network for selection of multiple "serving" base stations (that is data forwarding base stations).

US 2002/0118665 describes a system and method in which signals sent from a UE in UL are received by multiple base stations (one target and multiple non-target) and forwarded by non-target base stations to a target base station for combination and determination of necessity of power adjustment in the UE. The non-target base stations have received a UE-specific code-pattern to decode the UL signals transmitted by the UE.

The application does not describe different roles for a participating (non-target) base station that allow various levels of involvement beyond that of a data forwarding base station, which is the only non-target base station behaviour described in the patent. Base stations are not dynamically configured to forward, store or not forward data and/or participate in measurements on the UL signals to prepare potential higher involvement when channel conditions change. A request for later forwarding of specific data that was stored in a base station is not mentioned.

SFNs used for downlink (DL) data transmission are well known. Such SFNs are DL-only, e.g. the DVB-T broadcasting technique, and do not provide for any uplink (UL) transmission capability.

A system that has multiple reception points receiving UL-traffic from a UE and being coordinated so that just sufficient parallel UL data is provided to a coordination entity to guarantee successful reception is not presently known.

The multipoint reception concepts of 3G and LTE systems are such that base stations are configured to receive UE's UL-traffic and it is expected that all such base stations forward received data for data combining (if applied). An UL transmission from a UE to multiple reception points using common UL-signals without base station-specific adaption of the UL-signals is not disclosed in the known prior art; especially in combination with an efficient selection of the reception points to measure UE's UL signals, and/or to forward respective data.

Permanent forwarding of UL traffic by all reception points receiving such UL-signals to a coordination entity would be inefficient, especially in a system in which the best reception points are changing dynamically.

US 2015/049649 A1 describes a small cell network in which nodes may be switched off to reduce interference where nodes in an off state may still continue to transmit or receive particular signals for discovery purposes. A UE reports detected discovery signals to a coordinating network node which may decide to turn on a particular small cell node.

US 2014/0204871 A1 describes a network in which a primary base station, other base stations and a mobile station communicate in a coordinated manner with information about a result of measuring a pilot signal is transmitted to the primary base station. US 2014/0133415 A1 describes uplink multiflow operations where nodes and UEs receive and transmit from/to multiple cells.

GENERAL DESCRIPTION

The present invention provides a method of controlling a mobile communication network, the method comprising, an uplink controlling entity, in response to reception quality measurement reports sent by a plurality of reception points within the mobile communication network following a transmission of data by a user equipment device, the reception quality measurement reports being responsive to the reception of the transmission, configuring the reception points within the mobile communication network such that each of the multiple reception points is configured to exhibit a participation behaviour with respect to at least one of subsequent measurement reporting and payload reporting with regard to transmissions from the user equipment device, the participation behaviour being dependent on the reception quality measurement report.

In a further aspect, the invention provides a network equipment entity for controlling uplink traffic in a mobile communication network, wherein the entity is arranged to receive reception quality measurement reports from a plurality of reception points of the mobile communication network following a transmission of data by a user equipment device and in response to configure the reception points to forward data received from the user equipment device and to send reception quality measurement reports, wherein each of the multiple reception points is configured to exhibit a participation behaviour with respect to at least one of subsequent measurement reporting and payload reporting with regard to transmissions from the user equipment device, the participation behaviour being dependent on the reception quality measurement report and wherein different reception points are configured differently such that only selected reception points receiving data signals from the user equipment device forward the data while others transmit only a reception quality report.

In a still further aspect, the invention provides a mobile communication network reception point arranged to receive data signals from a user equipment and to measure a reception quality of the received signals, wherein the reception point is further arranged to send a reception quality measurement report to an uplink controlling entity and to receive a configuration message from the uplink controlling entity to implement a participation behaviour with respect to at least one of subsequent measurement reporting and payload reporting with regard to transmissions from the user equipment device, the participation behaviour being dependent on the reception quality measurement report wherein the configuration message may command the reception point to transmit a reception quality measurement report of data received from the user equipment device but not the data.

In a yet further aspect, the invention provides a mobile communication network comprising a plurality of transmission and reception points and network equipment including an uplink controlling entity wherein the plurality of reception points are each arranged to transmit a reception quality measurement report to the uplink controlling entity in response to data received from a user equipment device and the uplink controlling entity is arranged to configure each reception point in response to the reception quality measurement report received from that reception point to exhibit a participation behaviour with respect to at least one of subsequent measurement reporting and payload reporting with regard to transmissions from the user equipment device, the participation behaviour being dependent on the reception quality measurement report such that selected ones of the reception points forward data received from the user equipment device and other reception points transmit further reception quality measurement reports only.

BRIEF DESCRIPTION OF THE DRAWINGS

Preferred embodiments of the present invention will now be described, by way of example only, with reference to the accompanying drawings in which.

DETAILED DESCRIPTION

Figure 1:
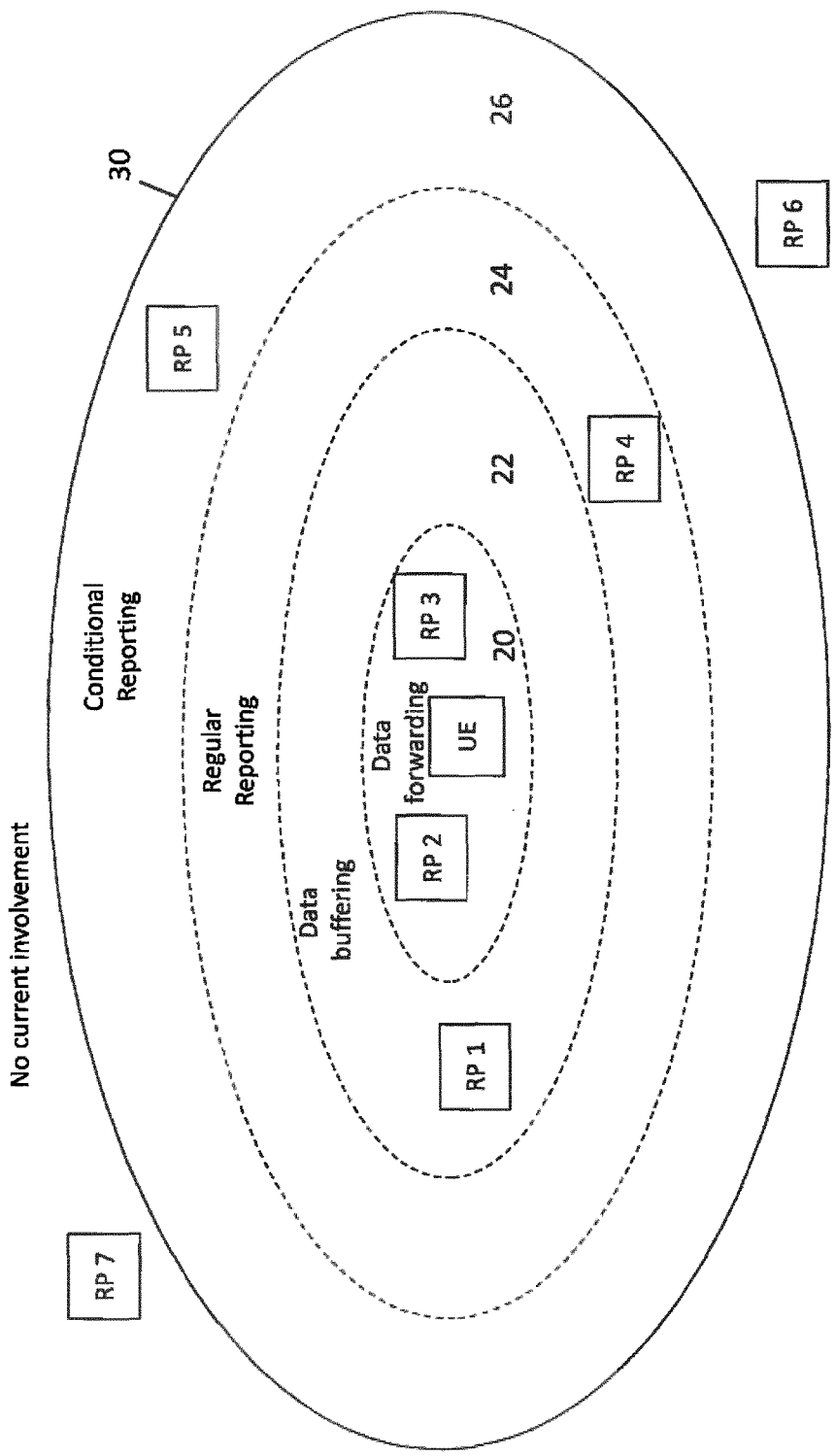
FIG. 1 shows a schematic representation of a network.

Referring to FIG. 1, there is shown a schematic diagram of a UE together with five base stations or reception points RP1-RP5 at varying separations from the UE. Two Reception points, RP2 and RP3 are located closest to the UE within an inner zone 20. RP1 is located in an adjacent zone, zone 22 while RP4 and RP5 are located in more outlying zones, zone 24 and zone 26 respectively.

In the invention, the various reception points RP1-RP5 are configured by a controller (not shown) to provide varying functionality in response to data received from the UE.

Broadly speaking, a group of reception points are defined which are actively involved in reception and control of a UE in an area around the UE's location. Consequently, other reception points, for example reception points RP6 and RP7, are controlled in a manner such that they are not involved in communication with the UE, even though they might be within radio range, without degrading the UE's network performance.

Using the invention it is possible to dynamically re-define the group of reception points to follow UE movements or adapt to changing channel conditions. The invention defines various levels of involvement of reception points in reception and control of a UE, so that an inner core of reception points, zone 20, actually receives and forwards data and towards the edge of the group the involvement degrades from buffering, over regular to conditional measuring of UL signals. An edge 30 of the defined group (seen from the specific UE as a centre) is defined to prepare the group for moving with the UE. This is depicted in FIG. 1. The group of reception points defined to be involved in reception and control of a UE is denoted Reception Cluster below.

The above provides a simplified view of the invention. The UE may report or the reception points may detect the UE's actual geographic position and use this information, together with the known position of reception points, to configure the reception points to be involved in UE's UL reception.

Figure 2:
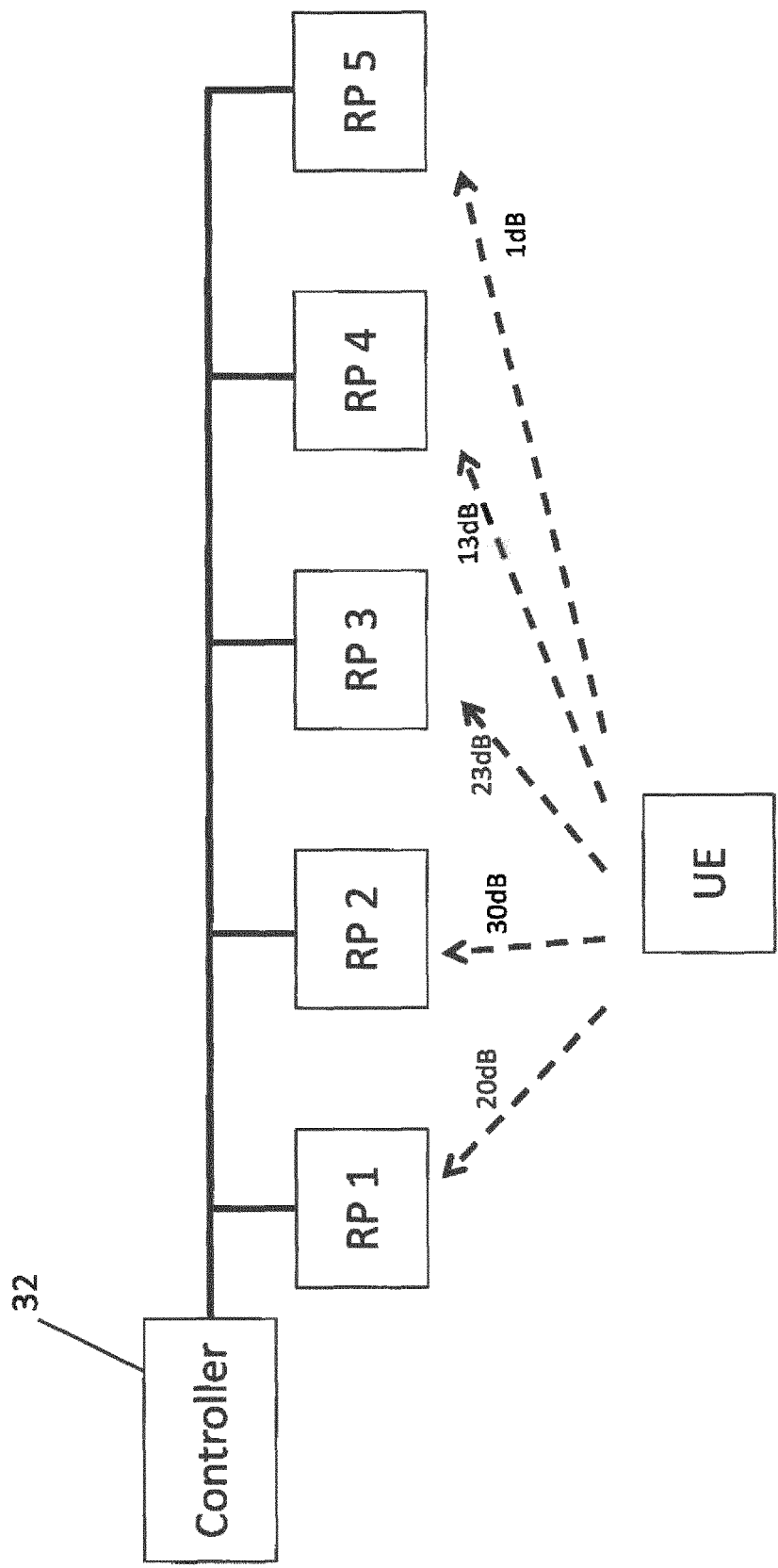
FIG. 2 shows another representation of the network of FIG. 1.

The arrangement shown in FIG. 1 is reproduced, in a different form in FIG. 2. FIG. 2 shows a controller 32 in communication with the five reception points RP1-RP5 (reception points RP6 and RP7 are not shown in FIG. 2 for clarity). The UE transmits data which is received by the reception points at varying signal strengths as indicated by values next to respective dotted lines leading from the UE to each of the reception points. The signal strength received at the reception points closest to the UE is higher than that received by more distant reception points.

The controller 32 is a Resource Control Unit (RCU) function entity arranged to select and configure reception points to act with regards to the uplink of a specific UE in a designated manner.

This dynamic selection and configuration of the reception points depends on receive quality of the respective reception point in relation to the receive quality of all reception points (average/statistics) in the respective Reception Cluster, i.e. the efficiency with which a certain reception point can contribute to the UL reception of a UE's signals.

The configuring allows the UL controlling entity to configure dynamically a number of different "participation behaviours" (or roles). As an example, four different roles are defined, with different behaviours regarding handling of measurement reporting and payload forwarding. Each particular reception point is dynamically assigned to one of these roles by the UL controlling entity (ordered from "relatively low Rx quality" to "relatively high Rx quality") as summarised in the following table:

| Role | RX quality | Rx-quality Measurement reporting behaviour | Payload forwarding behaviour |
| --- | --- | --- | --- |
| Role 1 | Low | send rx-quality reports to the UL controlling entity only if certain conditions are fulfilled, e.g. if the rx-quality is above a certain threshold | don't forward and don't store data |
| Rote 2 | Low to medium | send rx-quality reports regularly (unconditioned) to the UL controlling entity | don't forward or store data |
| Role 3 | Medium to high | send to the UL controlling entity rx-quality reports (and/or de-coding results in the form of success/no success) for packets received | don't forward data without explicit request by the UL controlling entity, store data for later forwarding, delete data from storage based on time or amount of data (circular buffer) or explicit deletion order |
| Role 4 | High | forward with rx-quality reports | forward data, i.e. actually contribute to the UL traffic reception. |

Furthermore, the inventive method enables re-configuration of a particular reception point during operation of the Reception Cluster by the UL controlling entity.

As shown in FIG. 2, the five reception points receive the UE's UL traffic with different reception (rx) quality. The reception points report their rx-quality and some also forward data. The reception points are then configured by the UL controlling entity to send reports (i) based on thresholds (RP5, e.g. Role 1 from table 1), (ii) regularly send reports (RP4, not necessarily for every packet, e.g. Role 2), (iii) buffer data received, but don't forward (RP1, e.g. Role 3, later explicitly requested to forward data that was not received due to degrading rx-quality in other reception points), Or (iv) forward data (RP2 & RP3, Role 4).

Figure 3:
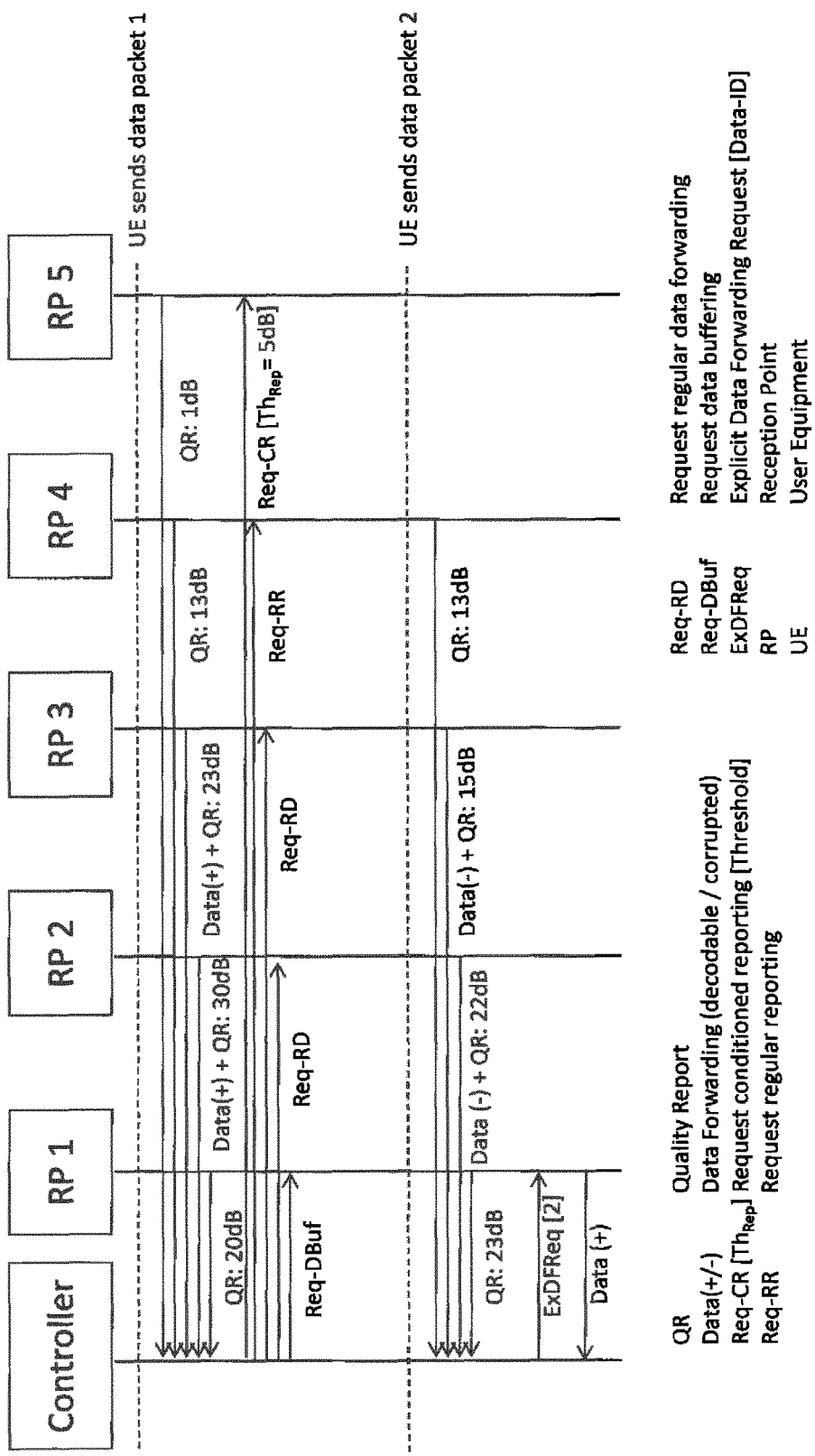
FIG. 3 is a message sequence chart of messages exchanged in the network of FIG. 1.

FIG. 3 is a message sequence chart relating to the entities shown in FIG. 2. In both figures the controller entity represents the "UL Controlling Entity". In one embodiment it may be assigned to, or be part of an SFN Resource Control Unit (RCU).

As shown in FIG. 2, after a UE has transmitted an initial data packet, each of the reception points RP1-RP5 transmits a receive quality report to the controller including a received signal strength value. In addition, RPS RP2 and RP3 include forward data. In response to the quality reports, the controller sends individual control messages to the respective reception points.

RP5 is requested to perform conditioned reporting with the message indicating a threshold of 5 dB. Accordingly, RP5 will only send a quality report if the received signal is above this threshold.

RP4 is requested to perform regular reporting while RP3 and RP2 are requested to perform regular data reporting. RP1 is requested to perform data buffering.

As shown in FIG. 3 after the transmission of a subsequent data packet by the UE, RP5 does not send a quality report because the received signal strength was too low. RP4 sends a measure of the received signal strength. Both RP2 and RP3 send a measure of the signal strength but due to received data corruption, they are not able to forward data and so indicate this in the message to the SFN controller. RP1 sends a quality report with a measure of the received signal strength.

In response to the data corruption indication from RP2 and RP3, the SFN controller sends an explicit data forwarding request to RP1 with a data identifier (shown as "2" in FIG. 3, i.e. the second data packet). RP1 responds by sending the buffered data which had been successfully decoded at RP1.

The invention provides a network function which may order/configure reception points to perform different behaviour regarding a single UE. In other words, the UL controlling entity may assign each reception point in a Reception Cluster a "participation behaviour" (or role e.g., one from the list above) that is perfectly suited to contribute to the consolidation of an individual UE's uplink data transmissions via multiple paths to multiple reception points.

The invention provides for a change between rx-quality reporting modes (on/off/conditional) and payload forwarding modes (on/off/conditional) based on quality reports (e.g., received signal quality reports as described above) and/or de-coding results (e.g., in the form of success/no success as described above) and/or data combination success (regarding the UL data consolidation process) in the UL controlling entity. Change one reception point's "participation behaviour" (or role) dependant on a plurality of other reception points. If one reception point has excellent rx-quality, then all others can stop receiving (in order to save energy) and just measure quality. If a lot reception points have limited rx-quality, the UL controlling entity can select a sufficient set of reception points in order to have high likelihood of successful data combination and keep sufficient others as backup to jump-in. Sufficient reports allow timely adaption of involved reception point by re-configuration of the "participation behaviour".

The described method can also lead to the inclusion and deletion of reception points to/from an Reception Cluster. Regarding a specific UE or regarding the majority of UEs a movement towards the edge of the Reception Cluster may be detected from the measurement reports. This may lead to inclusion of reception points near that edge to the Reception Cluster. The same measurements may lead to removal of other reception points from the Reception Cluster. The new reception point can be configured as described herein for the other reception points of a Reception Cluster. The measurement reports sent from reception points to the UL controlling entity may be used in combination with measurement reports sent from the UE to the UL controlling entity, i.e. known measurements performed by a UE on DL signals and reported in UL direction.

Similarly, the legacy measurement reports (i.e., measurements performed by a UE on DL signals) in conjunction with rx-quality reports from reception points inside or outside the Reception Cluster can be used to decide whether UEs should or should not be served by a Reception Cluster, e.g. if it is detected that a UE can very well be served by a Reception Cluster that it is currently not part of. On the other hand, serving the UE by a Reception Cluster may become inefficient and another Reception Cluster or a single reception point (BS) may serve a UE more efficient, thus the UE is removed from being served by the current Reception Cluster.

As a side effect it is possible for some reception points to only detect the UE's signal and measure rx-quality without the need to receive the full data in order to save energy. For that purpose the positions of UL reference signals in the resource grid (frequency/time) may be transmitted by the UL controlling entity to all reception points, e.g. in network broadcast mode. Such reference signals are well known and could, in an LTE-like system, consist of the DMRS (Demodulation Reference Signals) and SRS (Sounding Reference Signals) of the LTE-UL. Reception points that only have to measure rx-quality of a specific UE will configure their reception means to receive the anticipated reference signals in uplink direction and power down their reception means for the actual data carrying resources. Similarly, reception points that are currently configured to neither receive nor measure UE's UL signals will save energy by powering down their reception means for the complete configured UE's UL resources (data and reference signals).

As a consequence, the information collected by the UL controlling entity will also lead to the decision to switch off reception points all together based on their significance in reception of at least a meaningful number of UEs in a Reception Cluster.

Furthermore, the inventive method enables re-configuration of a particular reception point during operation of the Reception Cluster by the UL controlling entity.

In the invention the UL controlling entity selects dynamically the type of a particular UE's reception point's "participation behaviour" (or role e.g., one from the list above). For other UEs served by the same reception point the "participation behaviour" (or role) may be configured differently. This decision is made by the UL controlling entity based on individual rx-quality measurements from all reception points. In the UL controlling entity, dynamic re-configuration of a particular UE's "participation behaviour" (or role) during operation of the Reception Cluster is performed for instance based on the rx-quality reports received from the various reception points.

The UL controlling entity receives data packets from forwarding reception points and consolidates data to ensure a single successfully received UL-data stream taking into account the rx-quality reported along with the data. If necessary the UL controlling entity requests forwarding of buffered data packets from reception points and if necessary initiates deletion of stored data packets by reception points.

The reception points receive configurations (and re-configurations during operation) for data reception of specific UEs. If so configured the reception points do not receive data in the UE's UL-resources (time-frequency-grid), thus save energy.

If so configured, the reception points measure and report UE's UL signals and verify configured conditions for reporting. If so configured, they receive data, decode data, forward or store the data and report de-coding results. If requested, the reception points forward and/or delete stored data.

A system as described with multiple base station receiving the same (unmodified) data stream at different reception points, the steps is not known.

In the above, the UL controlling entity is mentioned as the single reception point of measurement reports from the reception points, and actually forwarded data (payload). It is common in modern mobile networks, like LTE, to divide the network functionality into control-functions performed by the control-plane (c-plane) and functions within the actual data path by the user-data-plane (u-plane). Network entities usually have functions of either of the planes but not both. In real live deployments network operators may then decide to deploy both entities in a single piece of hardware (server) or they keep the separation as in the c-/u-plane model.

Mapped to the invention, the usual model would require to have an UL controlling entity for all mentioned control functionality (configuration of reception points, . . . ) and a separate UL user-plane entity that receives and combines the forwarded data traffic. Nothing in this invention should prevent such a functionality split; it may even be beneficial for the system. Just for ease of description and readability, we use the term "UL controlling entity" for both c- and u-plane functions.

The invention is beneficial as it reduces the amount of exchange of data on the interface between the multiple reception points and the UL controlling entity, as data will only be forwarded, if needed. Further it reduces energy consumption, as reception points could be switched off or could be configured to perform a reduced set of tasks, if reliable UL operation is granted by other reception points.

The frequency of regularly sending the measurement reports (rx-quality reports as defined above) from the various reception points to the UL controlling entity according to this invention may vary depending on occurrence of specified events (reception/detection of one or a number of packets, detection of signals, no detection of significant signals in allocated resources) or may be fixed. It may be set so that a reception point reports on a "per packet" bases or a "per amount of data" or "per number of packets". It may be an absolute frequency, e.g. one report per second, per 100 milliseconds or per 10 seconds. The rx-quality reports collected by the various reception points may include a mean value calculated over a configurable period of time.

The conditions for sending conditional rx-quality reports may also include a timing aspect as above (a maximum or minimum frequency). Otherwise or in addition the condition may be based on rx-quality, measured interference level, estimated channel conditions between reception point and UE and/or priority of the service the UE is configured to use and for each of these parameters the condition may include to exceed, meet or undergo a pre-defined threshold once or for a specified period of time.

The rx-quality reporting may include the rx-signal strength, a relation of the rx-signal strength to measured interference (signal to interference and noise ratio, SINR), a channel condition (measured and calculated), the decoding result (successful/unsuccessful, number of errors), the data packet length or similar parameters. In one embodiment the reception point may calculate from at least one of these values a consolidated "UL channel reliability indicator" (per UE). In doing so, the UL controlling entity may only receive a list of this "UL channel reliability indicators" from certain reception points (depending on configuration) thereby reducing the traffic in the core network even further. The buffering of data for later transmission after receiving an explicit request is done in the reception point's memory or in a memory associated with the reception point. Deletion of the data may be done a specific time after reception so that the UL controlling entity has enough time to request delivery (re-transmissions). It may also be done after reception of a certain number of packets or an amount of data or a message from the UL Controlling entity may request deletion explicitly. The latter message may be broadcast on the network by the UL Controlling entity to all reception points and it may request deletion of multiple buffered data units to decrease the data load used on the network for requesting deletion. In case of unsuccessful reception (unsuccessful decoding) of a data unit by a reception point the data unit may be buffered and delivered on request to allow successful decoding in the UL Controlling entity, or it may not be buffered. In case the UL Controlling entity requests delivery of data that has not been buffered, the request may be answered with a failure message, it may not be answered at all or the UL Controlling entity may send a list of alternative reception points so that the reception point that has not buffered the data forwards the delivery request to the next reception point on the list. Based on the number of reception points on the list or based on time the forwarding of the request may stop and a failure message may be send by the last involved reception point including a reference to the original message.

While the current invention can be deployed beneficially in various network environments of different nature, a deployment in a single frequency network (SFN) may manifest the invention's best mode. In SFNs generally multiple transmission points transmit identical data in a synchronous manner so that the individual transmission points cannot be distinguished by a receiving UE. While the SFN-nature of a network mainly describes a property of the DL, SFNs go very well together with an UL that allows for reception of UL data by multiple reception points without the need to distinguish the reception points in the UL-signals.

When deployed in an SFN, the Reception Cluster described in the current invention may be part of an SFN cluster that contains in addition to the described reception points also multiple transmission points synchronously transmitting data to one or more UEs. These transmission points may or may not be co-located with respective reception points and the act of adding or removing reception points to or from an SFN cluster may include adding or removing respective transmission points to or from the SEN cluster.

When deployed in an SFN, the controller 32 described in the current invention may be part of an SFN controller that controls the participation and involvement of reception points in the UL data forwarding of a single or multiple UEs. The SFN controller may in addition have other functionality as for example control of participation and involvement of transmission points in DL data transmission to a single or multiple UEs served by an SFN.

The invention claimed is:

1. A method of controlling a mobile communication network, the method comprising, an uplink controlling entity, in response to reception quality measurement reports sent by a plurality of reception points within the mobile communication network following a transmission of data by a user equipment device, the reception quality measurement reports being responsive to the reception of the transmission, configuring the reception points within the mobile communication network such that each of the multiple reception points is configured to exhibit a participation behaviour with respect to at least one of subsequent measurement reporting and payload reporting with regard to transmissions from the user equipment device, the participation behaviour being dependent on the reception quality measurement report.

2. The method according to claim 1, wherein the measurement reporting participation behaviour is one of conditional reporting and unconditional reporting and the payload reporting participation behaviour is one of no forwarding or storing of data, storing but no forwarding of data without an explicit request, conditional forwarding of data and forwarding of data.

3. The method according to claim 2, wherein a configuration of a participation behaviour of conditional transmission of quality measurement reports contains at least one condition based on at least one threshold for a reception quality measurement.

4. The method according to claim 2, wherein a configuration of a participation behaviour of conditional forwarding of data contains at least one condition indicating at least one out of a threshold for a reception quality measurement and a decoding result indicating the result of an attempt to decode data received from the user equipment device.

5. The method according to claim 1, wherein in response to the reception quality measurement reports, individual reception points within the mobile communication network are configured to send only a reception quality measurement report.

6. The method according to claim 1, wherein one or more selected reception points a e configured to buffer data received from a user equipment device and to forward said buffered data only upon receipt of a command from the uplink controlling entity.

7. The method according to claim 1, wherein one or more of the reception points are configured to not decode data received from a user equipment device.

8. The method according to claim 1, wherein the mobile communication network comprises multiple transmission points transmitting identical data synchronously to at least one user equipment devices, thereby forming a single frequency network.

9. The method according to claim 1, wherein the selected reception points receive the data received from a user equipment device from common signals that are transmitted by the user equipment without adaption of the signals to any specific reception point of the receiving reception points.

10. A network equipment entity for controlling uplink traffic in a mobile communication network, wherein the entity is arranged to receive reception quality measurement reports from a plurality of reception points of the mobile communication network following a transmission of data by a user equipment device and in response to configure the reception points to forward data received from the user equipment device and to send reception quality measurement reports, wherein each of the multiple reception points is configured to exhibit a participation behaviour with respect to at least one of subsequent measurement reporting and payload reporting with regard to transmissions from the user equipment device, the participation behaviour being dependent on the reception quality measurement report and wherein different reception points are configured differently such that only selected reception points receiving data signals from the user equipment device forward the data while others transmit only a reception quality report.

11. The network equipment entity according to claim 10, wherein the entity is arranged to instruct selected reception points to buffer data received from the user equipment device and only forward the data on receipt of a command.

12. The network equipment entity of claim 10, wherein the entity is arranged to command selected ones of the reception points to not decode data signals received from the user equipment device.

13. A mobile communication network reception point arranged to receive data signals from a user equipment and to measure a reception quality of the received signals, wherein the reception point is further arranged to send a reception quality measurement report to an uplink controlling entity and to receive a configuration message from the uplink
    controlling entity to implement a participation behaviour with respect to at least one of subsequent measurement reporting and payload reporting with regard to transmissions from the user equipment device, the participation behaviour being dependent on the reception quality measurement report wherein the configuration message may command the reception point to transmit a reception quality measurement report of data received from the user equipment device but not the data.

14. The mobile communication network reception point according to claim 13, wherein the reception point receives the data signals from common signals that are transmitted by the user equipment without specific adaption of the signals to the reception point.

15. The mobile communication network reception point according to claim 13, wherein the reception point is arranged, on receipt of a command from the uplink controlling entity to buffer the data received from the user equipment device and forward such data only on receipt of a further command from the uplink controlling entity.

16. A mobile communication network comprising a plurality of transmission and reception points and network equipment including an uplink controlling entity wherein the plurality of reception points are each arranged to transmit a reception quality
    measurement report to the uplink controlling entity in response to data received from a user equipment device and the uplink controlling entity is arranged to configure each reception point in response to the reception quality measurement report received from that reception point to exhibit a participation behaviour with respect to at least one of subsequent measurement reporting and payload reporting with regard to transmissions from the user equipment device, the participation behaviour being dependent on the reception quality measurement report such that selected ones of the reception points forward data received from the user equipment device and other reception points transmit further reception quality measurement reports only.

17. The mobile communication network according to claim 16, wherein the reception points are arranged to buffer data received from the user equipment device on receipt of a corresponding configuration message from the uplink controlling entity and to forward the data only on receipt of a corresponding command from the uplink controlling entity.

18. The mobile communication network according to claim 16, wherein multiple of the plurality of transmission points transmit identical data synchronously to the user equipment device, thereby forming a single frequency network.

* * * * *